Jan. 31, 1950  A. M. NELSEN  2,496,015
SAFETY SUPPORT FOR BRAKE BEAMS
Filed Jan. 20, 1948

Anton M. Nelsen
INVENTOR.

BY
*Attorneys*

Patented Jan. 31, 1950

2,496,015

UNITED STATES PATENT OFFICE 2,496,015

SAFETY SUPPORT FOR BRAKE BEAMS

Anton M. Nelsen, North Platte, Nebr.

Application January 20, 1948, Serial No. 3,237

7 Claims. (Cl. 188—210)

This invention relates to new and useful improvements in the braking mechanism of railway car trucks, and the primary object of the present invention is to provide a novel and improved safety support for the brake beams of a railway car truck.

Another important object of the present invention is to provide a safety support for railway car truck brake beams that will retain a broken brake beam in a raised position thereby preventing the derailment of the car truck usually occurring due to the downward movement of a brake beam.

A further object of the present invention is to provide an auxiliary support for the brake beams of a railway car truck that is small and compact in structure and which is quickly and readily adjusted relative to the car truck bolster beam for supporting brake beams of various sizes or brake beams which are disposed at various distances relative to the bolster beam.

A still further aim of the present invention is to provide a safety support for the brake beams of railway car trucks that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
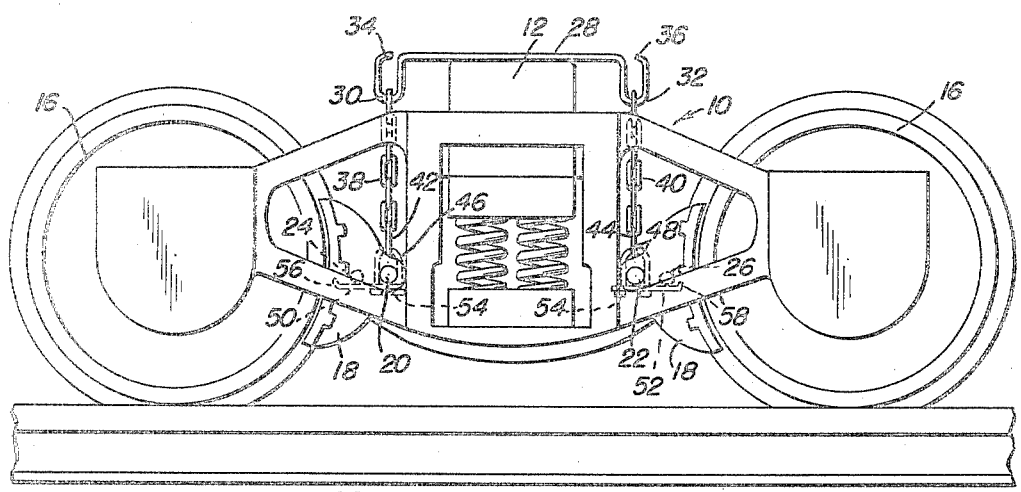
Figure 1 is a fragmentary side elevational view of a railway car truck, and showing the present invention applied thereto.
Figure 2:
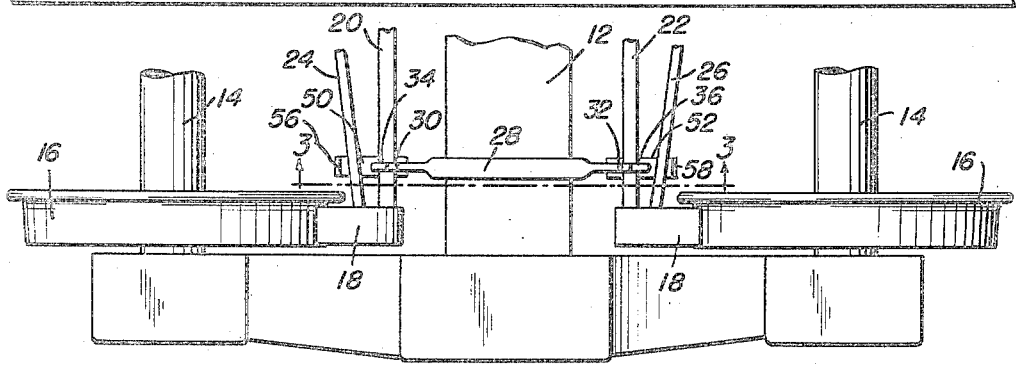
Figure 2 is a top plan view of Figure 1, and with parts removed therefrom.

Referring now to the drawings in detail, wherein for the purpose of illustration, there is disclosed a preferred embodiment of the present invention, the numeral 10 represents a railway car truck frame generally, comprising a transversely extending bolster beam 12, axles 14 supporting rail engaging wheels 16, brake shoes 18 for the wheels 16, a pair of brake beams 20 and 22 disposed on opposite sides of the bolster beam 12, and a pair of brake beam braces 24 and 26 which are connected to the brake shoes.

The present invention does not attempt to claim the above conventional structure, but is merely an attachment to be used in conjunction with the same to prevent downward sagging of the brake beams 20 and 22 or the brake beam braces 24 and 26.

To accomplish the desired results, there is provided a substantially rectangular base plate 28 that rests upon the upper face of the bolster beam 12. The reduced end portions of this plate 28 terminate in depending hook elements 30 and 32 which are aligned with the brake beams 20 and 22 respectively. The free extremities of these hook elements 30 and 32 are turned inwardly to provide arcuate retaining lips 34 and 36.

Engaging the hook elements 30 and 32, is a selected link of a pair of depending link chains 38 and 40, the lower free ends 42 and 44 which receive U-shaped elements or U bolts 46 and 48 that engage or embrace the brake beams 20 and 22.

Figure 3:
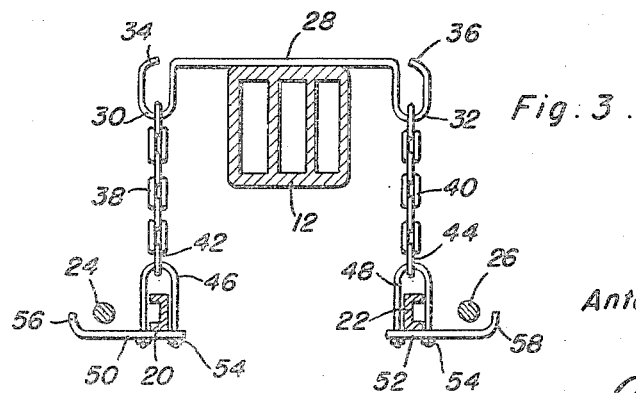
Figure 3 is an enlarged longitudinal vertical sectional view taken substantially on the plane of section line 3—3 of Figure 2.

Slidably mounted on the leg portions of these U-shaped elements 46 and 48 are support straps 50 and 52 which are retained relative to the U-shaped elements 46 and 48 by nuts or the like 54 which are threadingly engaged on the leg portions of said U-shaped elements. The straps 50 and 52 extend outwardly from the elements 46 and 48 in spaced relationship to the brake beam braces 24 and 26, and the outermost ends of the straps 50 and 52 are turned upwardly to provide arcuate retaining tongues or stops 56 and 58 that loosely oppose the brake beam braces 24 and 26, as shown best in Figure 3 of the drawing.

It should be noted, that one of these plates 28 supporting the chains 38 and 40 and U-shaped elements 46 and 48, and straps 50 and 52 are disposed on the bolster beam adjacent each side of the railway car truck or a group of the same may be employed for supporting the brake beams and brake beam braces at selective points relative to the bolster beam.

In practical use of the device, if the brake beam 20 and 22 should break, or if both of said brake beams 20 and 22 should break, the chains 38 and 40 will retain the same in a raised position to prevent derailment of the railway car which is usually effected by the breaking of such brake beams.

The brake beam braces 24 and 26 must flex slightly, therefore the straps 50 and 52 will normally be spaced relative to the same, however, should the brake beam braces 24 and 26 become broken, the same will be supported by the straps 50 and 52 and will be retained relative to the said straps by the stops 56 and 58.

Obviously, the chains 38 and 40 may be adjusted for broken beams and braces which are disposed at various distances from the bolster beam or which are of various sizes or diameters.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a car truck including a side frame, a pair of spaced parallel brake beams, a pair of spaced brake beam braces disposed adjacent said brake beams, and a bolster beam interposed between said brake beams; a support plate carried by the bolster beam, hanger means carried by said support plate, means connecting said hanger means to the brake beams, and means carried by said connecting means and disposed beneath the brake beam braces for supporting said braces in case of failure of the main support thereof.

2. The combination of claim 1 wherein said connecting means includes a pair of U-shaped attaching members embracing said brake beams.

3. The combination of claim 1 wherein said last mentioned means includes a pair of support straps positioned under said brake beam braces and having upwardly turned end portions to limit the movement of the brake beam braces relative thereto.

4. The combination of claim 1 wherein said support plate includes a chain engaging loop at each end thereof which is disposed above and aligned with the brake beams.

5. Means for supporting broken brake beams and brake beam braces of a railway car in a raised position comprising a base member adapted to be supported upon a bolster and having end portions extending outwardly from a bolster, hangers depending from said end portion, means carried by said hangers for embracing the brake beams of a railway car truck frame, and means carried by said last mentioned means adapted to be disposed beneath the brake beam braces.

6. In a car truck including a side frame, a pair of spaced parallel brake beams, a pair of spaced brake beam braces disposed adjacent said brake beams, and a bolster beam interposed between said brake beams; means for supporting the brake beams and brake beam braces in a raised position, said means comprising an elongated base member bearing upon the bolster beam and disposed transversely thereof, hooks at the ends of said base member and positioned above said brake beams, hangers carried by and depending from said hooks, U-shaped links carried by said hangers and embracing the brake beams, substantially horizontal retainer plates carried by the legs of said U-shaped links and including outwardly projecting extensions having central portions spaced vertically beneath said brake beam braces.

7. The combination of claim 6 wherein the free outer extremities of said extensions are curved upwardly to provide stops.

ANTON M. NELSEN.

REFERENCES CITED

The following references are of record in the file of this patent:

UNITED STATES PATENTS

| Number | Name | Date |
| --- | --- | --- |
| 842,474 | Lightbody | Jan. 29, 1907 |
| 1,494,838 | Hedgcock | May 20, 1924 |
| 1,871,980 | Gayan | Aug. 16, 1932 |